United States Patent [19]
Zaderej

[11] 4,302,670
[45] Nov. 24, 1981

[54] ELECTROGENIC SEED TREATER

[75] Inventor: Andrew Zaderej, South Bend, Ind.

[73] Assignee: Claude E. Corson, Elkhart, Ind.

[21] Appl. No.: 58,271

[22] Filed: Jul. 17, 1979

Related U.S. Application Data

[63] Continuation of Ser. No. 919,689, Jun. 27, 1978, abandoned.

[51] Int. Cl.³ .............................................. H05E 3/06
[52] U.S. Cl. .................................... 250/324; 361/230
[58] Field of Search .......... 250/324, 325, 326, 423 R, 250/492 B; 361/230, 231

[56] References Cited

U.S. PATENT DOCUMENTS

| | | | |
|---|---|---|---|
| 3,358,289 | 12/1967 | Polec | 250/325 |
| 3,396,308 | 8/1968 | Whitmore | 250/324 |
| 3,471,695 | 10/1969 | Hudson et al. | 250/325 |
| 3,643,128 | 2/1972 | Testone | 361/230 |
| 3,873,835 | 3/1975 | Ignatjeu | 250/324 |
| 4,096,544 | 6/1978 | Ignatjeu | 361/231 |
| 4,208,965 | 6/1980 | Eichler | 250/324 |

*Primary Examiner*—Bruce C. Anderson
*Attorney, Agent, or Firm*—Oltsch, Knoblock & Hall

[57] ABSTRACT

Method and apparatus for treating seeds, such as corn, soy beans and rice, in which the seeds are first coated with a mixture of water and enzyme and then subjected to a series of electrical potentials that causes water, ion particles, and nitrogen components to be impregnated within the seed for the purpose of improving the embryonic and growth potential of the seeds.

4 Claims, 12 Drawing Figures

ELECTROGENIC SEED TREATER

This is a continuation of application Ser. No. 919,689, filed June 27, 1978, now abandoned.

BRIEF SUMMARY OF THE INVENTION

This invention relates to a method and apparatus for treating seeds by electronic stimulation to increase the embryonic potential of the seed and improve plant development and growth.

As early as 1746 plants were treated with electricity for the purpose of increasing growth and blossom production. Through the years and into the 20th century efforts have been directed to improving plant development and growth by the utilization of electrical energy. In the following described invention high energy electronics in conjunction with bio-chemical principles is utilized to provide an improved method and application of electrical energy for seed treatment.

The seeds are first coated with a mixture of water and enzyme and then subjected to an electrical potential which causes the water and enzyme coating about the seed to be driven into the embryo of the root cell and other internal parts of the seed. the moistened seeds are then subjected to a second electrical potential which causes the seeds to be bombarded with ions, electrons and protons as well as with elements of fixed nitrogen formed by the fixation of the composition of ambient air about the seeds. These particles enter the seed to serve as a stored energy source and material source for later plant growth and development upon seed planting.

Accordingly, it is an object of this invention to provide a process by which seeds are electronically stimulated to improve their embryonic potential.

Another object of this invention is to provide a process by which the root cell of a seed receives energy and food material through electronic stimulation prior to planting.

Another object of this invention is to provide a method to improve plant growth and development through electronic stimulation of the internal parts of the seed cell, such as methachondria, cytochrome, chloroplast, and cell membrane.

Another object of this invention is to provide apparatus for electronically bombarding a free falling object with electrons, ions and protons.

Still another object of this invention is to provide apparatus for subjecting an object to high energy particle bombardment in ambient air with low ozone production.

Still another object of this invention is to provide apparatus for subjecting an object to ion and fixed nitrogen particle bombardment from a high energy potential within the presence of air.

Still another object of this invention is to provide a single shot starter for a push-pull inverter.

And still another object of this invention is to improve working characteristics for switching transistors and power transformers.

Still another object of this invention is to provide means for modulating the pulse width of rectified AC voltage.

Other objects of this invention will become apparent upon a reading of the following description.

BRIEF DESCRIPTION OF THE DRAWINGS

A preferred embodiment of this invention has been illustrated for purposes of description wherein.

DESCRIPTION OF THE PREFERRED EMBODIMENT

The preferred embodiment illustrated is not intended to be exhaustive or to limit the invention to the precise form disclosed. It is chosen and described in order to best explain the principles of the invention, its application and practical use to thereby enable others skilled in the art to best utilize the invention.

APPARATUS

Figure 1:
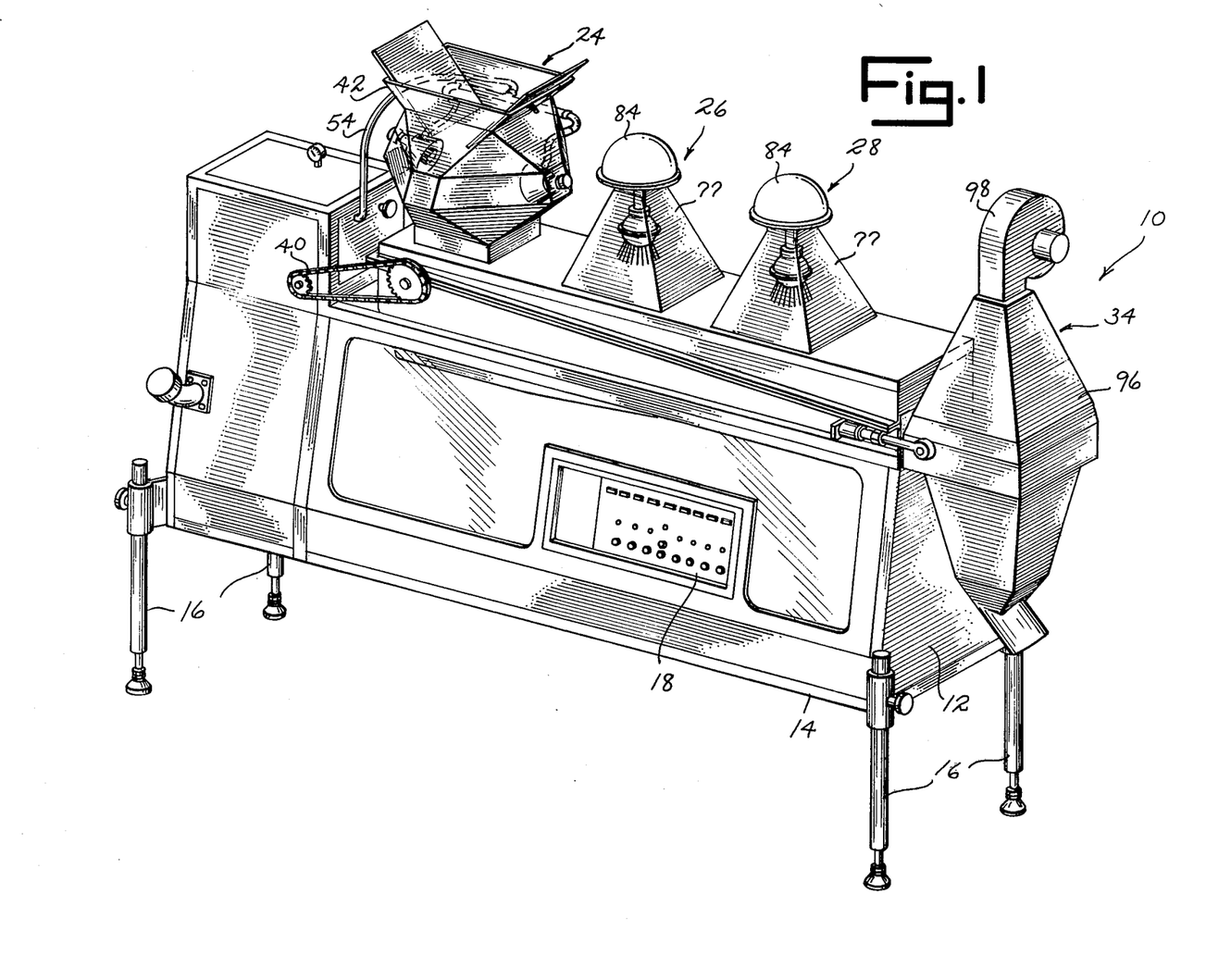
FIG. 1 is a perspective view of the seed treating apparatus.
Figure 2:
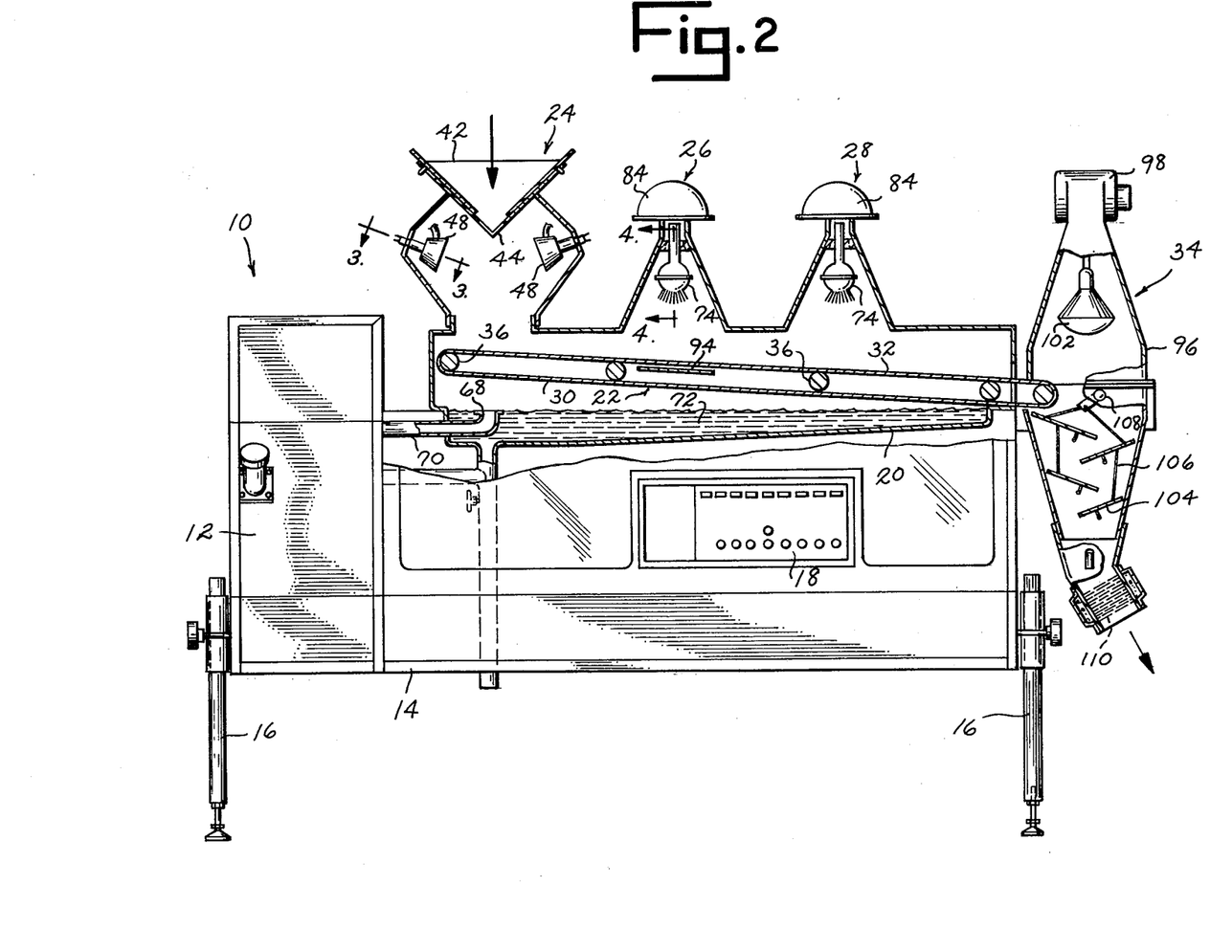
FIG. 2 is an elevational side view of the seed treating apparatus having portions thereof sectionalized for purposes of illustration.
Figure 6:
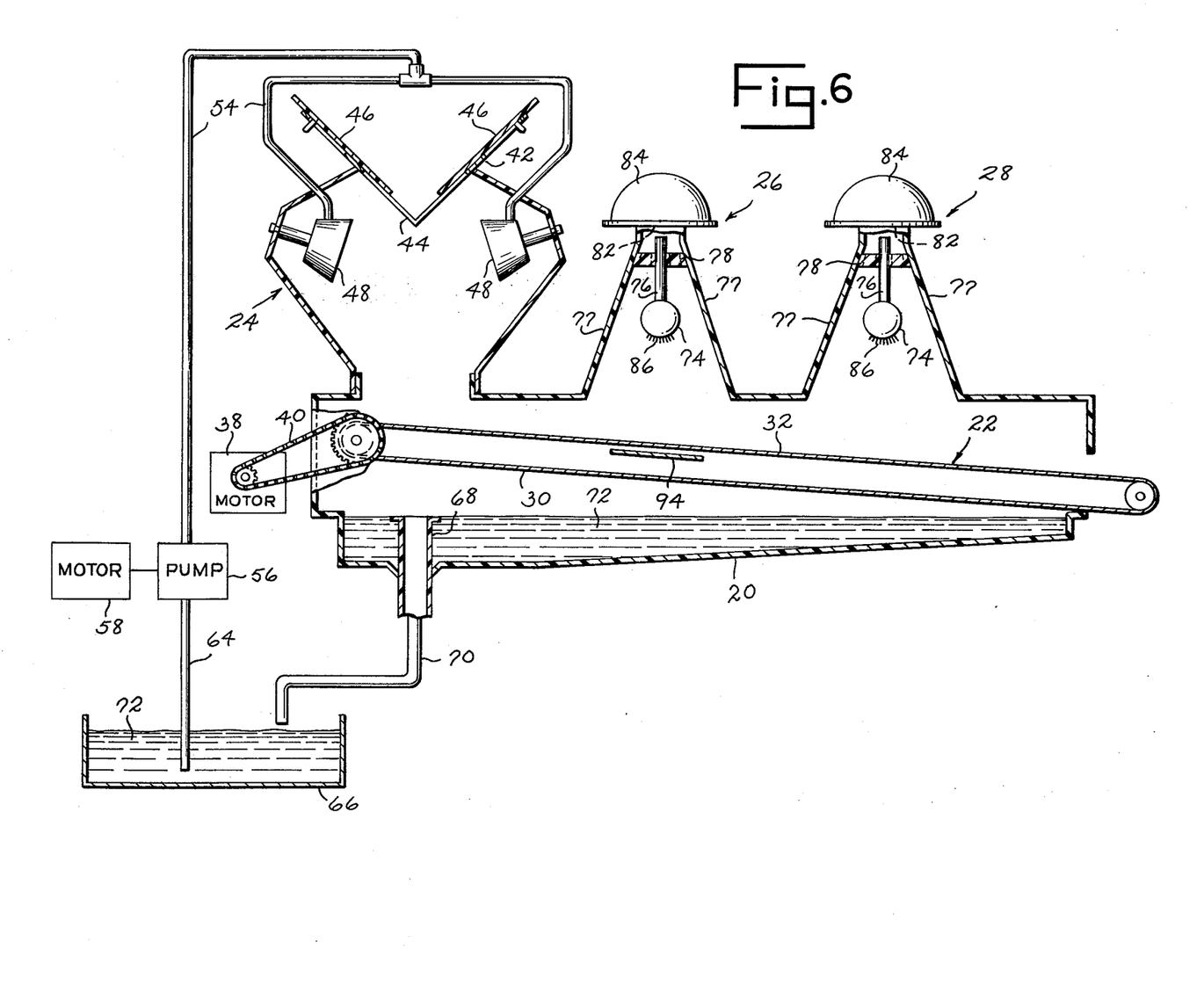
FIG. 6 is a schematic view of the seed treating apparatus.
Figure 7:
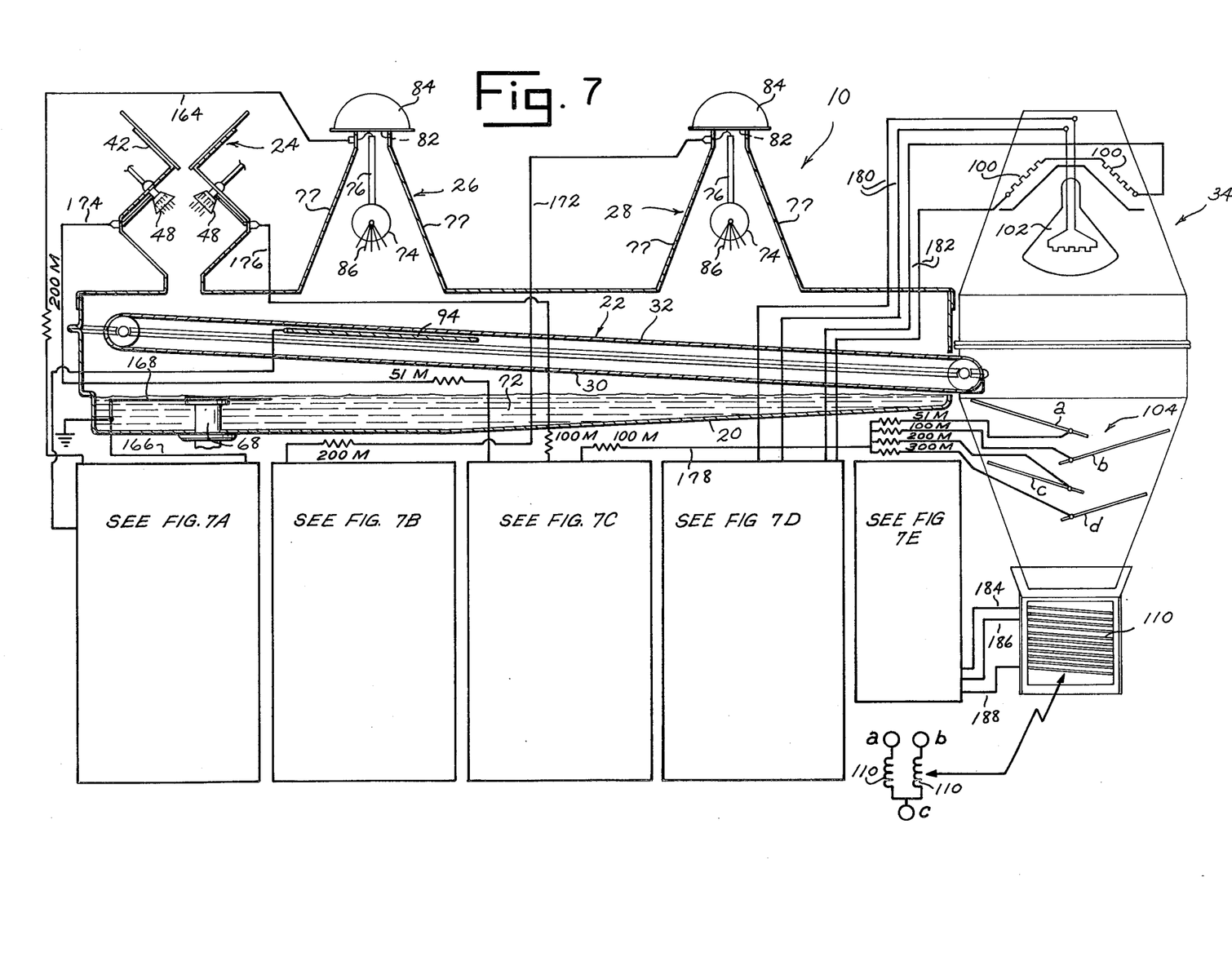
FIG. 7 is another schematic view of the seed treating apparatus having provisions for incorporating the electronic circuitry.

Referring to FIGS. 1 and 2, seed treater 10 of this invention includes a housing 12 supported upon a frame 14. Frame 14 includes legs 16 for contact with a suitable foundation or the ground. A control panel 18 is carried at the front of housing 12 and behind which, located within the housing, is the circuitry shown partly in FIGS. 7A-7E for controlling the operation of the treater. A tank 20, seen in FIGS. 2, 6 and 7 is carried within the upper portion of housing 12. A conveyor 22 is positioned above tank 20. Located above conveyor 22 are three work stations, namely, a seed blender station 24, a primary energy generator 26, and a secondary energy generator 28. The head of belt 30 of conveyor 22 is located with its upper run 32 positioned under blender station 24. The foot of conveyor belt 30 at its upper run 32 is located within a cathodic discharge station 34, which constitutes the fourth and final work station of the illustrated treater 10.

Belt 30 of conveyor 22 is supported upon rollers 36 with the belt being formed of a dielectric screen material to allow for the passage of liquid and ions through the belt. Housing 12 houses a motor 38 which is drive-connected by a chain and sprocket drive 40 to conveyor 22. Actuation of motor 38 causes the rotative movement of conveyor belt 30 with upper run 32 of the belt traveling in an inclined direction from blender station 24 to discharge station 34. The speed of motor 38 and thus the speed of conveyor belt 30 is variable to permit the travel time of upper run 32 of the belt to be selectively set for the particular seed and type treatment desired.

Figure 3:
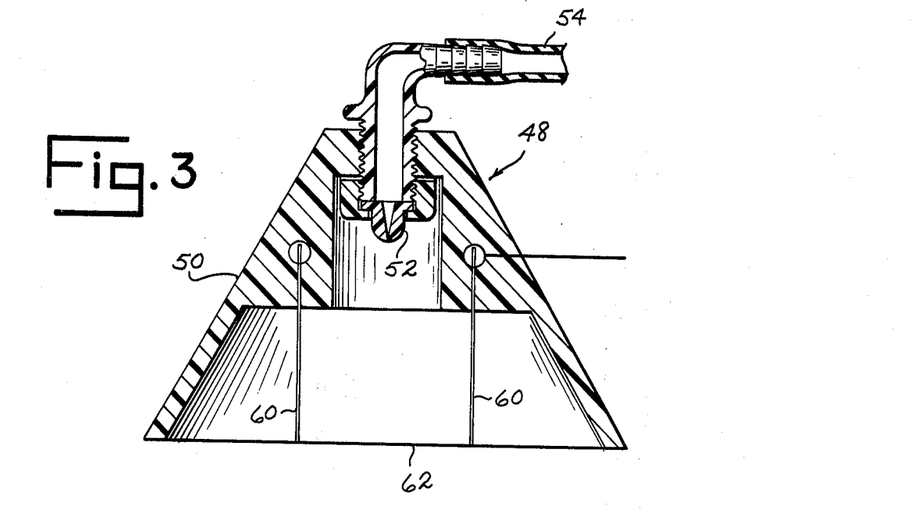
FIG. 3 is a detailed sectional view taken along line 3—3 of FIG. 2.

Blender station 24 of treater 10 includes a hopper part 42 with a lower opening 44 through which seed when transported by a conveyor or other means (not shown) can fall. The size of opening 44 in hopper 42, and thus the discharge rate of the seed through blender station 24, can be varied by adjusting the spacing between overlying side wall plates 46. A pair of electrical probes 48 forming a part of blender station 24 are mounted below the discharge opening 44 in hopper 42 at oppositely located positions. Probes 48 are of like construction and are shown in detail in FIG. 3. Each probe 48 includes a dielectric cone-shape nozzle 50 having an orifice part 52 mounted along the axis of the nozzle. Each orifice part 52 is connected by a plastic or similar dielectric tubing 54 to a pump 56 driven by a motor 58, both housed within housing 12. Preferably several feet of tubing 54 extends between orifice parts 52 and pump 56 so as to create an electrical resistance to minimize feed back of the high voltage potential created about nozzles 50. The axes of nozzle 50 are preferably inclined approximately 30° from the horizontal with the orifice parts 52 of probes 48 being spaced approximately 14" apart within blender station 24. A plurality of conductive metal needles 60 are carried by each nozzle 50. Needles 60 are equally radially spaced from the axis of the nozzle and extend from the base of the nozzle adjacent orifice part 52 to the exterior edge 62 of the nozzle. Needles 60 which may be formed of stainless steel are also equal angularly spaced apart and number approximately 100 for each nozzle. The needles 60 of one probe 48 are connected to a negative high voltage potential of approximately 10,000 volts while the needles 60 of the remaining probe 48 are connected to a negative high voltage potential of approximately 60,000 volts.

Pump 56 has its outlet connected to tubing 54 which extends to probes 48. The inlet of pump 56 is connected to a tube 64 which extends into a reservoir tank 66 carried within seeder housing 12. Tank 20 which extends under the work stations of treater 10 includes an overflow drain pipe 68 which is connected by tubing 70 to reservoir tank 66. Liquid 72 is drawn from reservoir tank 66 by pump 56 and is expelled through orifice parts 52 of probes 48. The liquid thereafter drains into tank 20 which is maintained at a selected level by overflow pipe 68. Excess liquid delivered to tank 20 flows through tubing 70 and by gravity through a filter (not shown) for straining solid material particles into reservoir tank 66. Housing 12 and tanks 20 and 66 are almost entirely of a dielectric construction.

Figure 4:
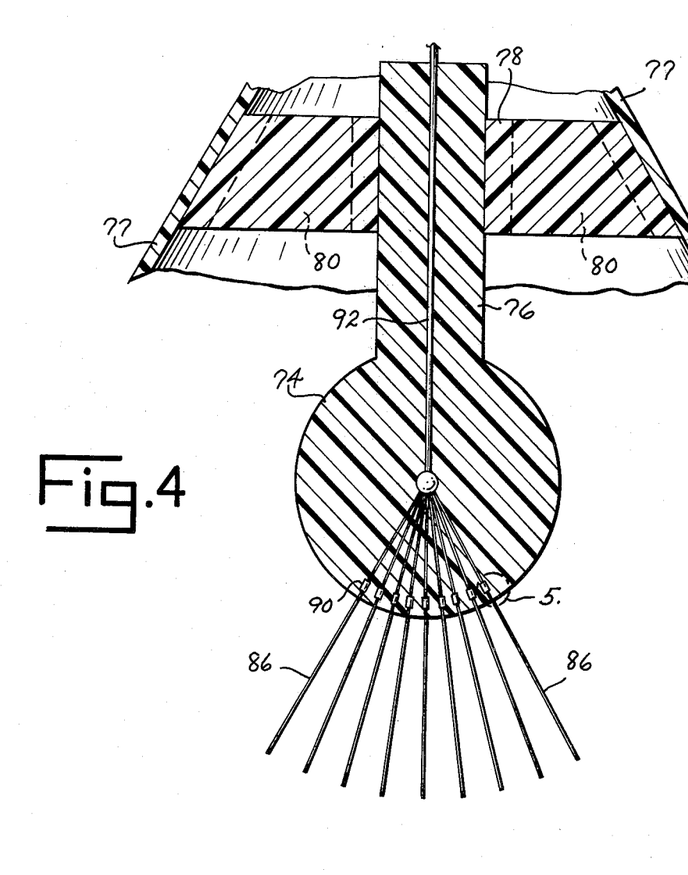
FIG. 4 is a detailed sectional view taken along line 4—4 of FIG. 2.

The work stations of treater 10 represented by primary energy generator 26 and secondary energy generator 28 are of similar construction. Each generator 26, 28 includes a spherical discharge part 74. Each spherical discharge part 74 is suspended spacedly above upper run 32 of conveyor belt 30 by a rod part 76. A connector 78 secures each rod part 76 in a spaced orientation from the pyramidal housing side walls 77 forming each energy generator work station. Each discharge part 74, rod part 76 and connector 78 are of a dielectric construction. A detailed view of the discharge part 74, rod part 76 and connector 78 of an energy generator 26, 28 is shown in FIG. 4. Each connector 78 is provided with a plurality of openings 80 which extend peripherially about its connected rod part 76 and which are located between the rod part and pyramidal side walls 77 of the treater housing 12. Housing 12 at the top of side walls 77 of each energy generator 26, 28 is open at 82 to allow ambient air flow downwardly through the housing and through openings 80 in connector 78 and about discharge part 74. A dielectric dome 84 is located spacedly over each upper opening 82 into housing 12 to prevent foreign matter and seeds from falling into the energy generators 26, 28 during operation of the seed treater.

Figure 5:
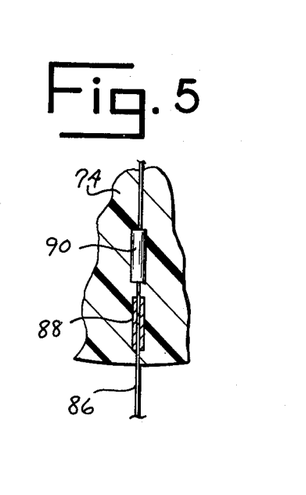
FIG. 5 is an enlarged detailed view of that portion of FIG. 4 enclosed within broken line circle 5.

A plurality of needles 86 extend radially outwardly from each discharge part 74. Needles 86 which cover the approximate lower ¼ spherical quadrant of each discharge part 74 are of an electrically conductive metal, such as stainless steel, and number between 500 and 1,000. Each needle 86 is embedded within the outer surface of its connecting discharge part 74 and is connected by a conductive sleeve or coupler 88 to a resistor 90 of 10 G ohms. Each resistor 90 is commonly connected to a wire 92 extending longitudinally through rod part 76. Each wire 92 is connected to a ripple DC voltage source having a peak voltage of approximately 150 KV. A grid 94 is located under discharge part 74 of primary energy generator 26 and is adjacently spaced below upper run 32 of conveyor belt 30. Grid 94 is connected to a slightly negative voltage source and acts as a bias during the operation of energy generator 26.

Cathodic discharge station 34 of seed treater 10 includes a housing 96 which like main housing 12 of the treater is also of a dielectric construction. An air blower 98 and heating coils 100 are located above the discharge end of conveyor belt 30 which terminates within housing 96. Heating coils 100 are shown schematically in FIG. 7. Also located above the discharge end of conveyor belt 30 is a quartz-tube infrared lamp 102.

Located within housing 96 but positioned below the discharge end of conveyor belt 30 is a plurality of negatively charged high voltage conductive plates 104. The uppermost plate "a" of plates 104 is supplied with a voltage of approximately 60,000 volts, plate "b" of approximately 50,000 volts, plate "c" approximately 40,000 volts and plate "d" approximately 30,000 volts. Additionally, each of the plates 104 is pivotally mounted within housing 96 with the plates being interconnected by cables 106 and crank arm 108 for shaking movement to clean the plates. During treater operation plates 104 are in a fixed, inclined overlapping orientation as shown. The lower discharge end of housing 96 includes coils 110 through which all seed must exit when passing through treater 10. Coils 110 produce R.F. energy in the range between 800 K Hz and 1.5 M Hz with an electric field intensity of approximately 3.2 watt/cm2.

METHOD OF OPERATION

A mixture of tap or similar conductive water and enzyme 72 fills tank 20 to its operating level. This liquid is also present within supply tank 66. The type of enzyme in liquid 72 will vary but is preferably of the MFO type. Operation of pump 56 causes liquid 72 to be emitted under pressure from orifice parts 52 of probes 48, filling the blender station 24 below hopper 42 with a mist. Liquid 72 is provided to orifice parts 52 at about 100 pounds per square inch pressure which reduces the liquid particle size within the blender station to between 5 to 15 microns. At the same time liquid 72 is emitted from probes 48, needles 60 of each probe are subjected to the high energy negative potential, one probe having a potential of approximately 10,000 volts and the other probe having a potential of approximately 60,000 volts.

The liquid 72 in its mist form is directed across needles 60 due to the relative position of the needles and orifice parts 52 and is subjected to potentials provided by needles 60. This transforms the liquid mist into a flux field consisting of positive and negative ions, protons and electrons.

Seed, such as corn, soy beans, rice or other types of grains, are introduced by a conveyor or similar means into hopper 42 of blender station 24. The seeds fall through opening 44 in hopper 42 and pass between probes 48 within the mist of liquid 72. When the seeds are subjected to the potential of probes 48, the polarity inside the root cell of the seed embryo is improved. Also the ions, protons, and electrons formed by the energy recombination caused within the liquid mist on potential contact are driven into the root cell and other parts of the seed. Further, the enzyme in the liquid combination allows the tiny flux of water and the particles thereof to be driven into the seed past its lipid layer. The liquid coated seeds then fall onto upper run 32 of conveyor belt 30 with the seeds being placed into a electrical conductive mode for the next treatment step.

During the operation of blender station 24, motor 38 is in operation serving to continuously rotate conveyor belt 30. The coated seeds passing through the blender station fall upon the upper run 32 of the conveyor belt and are transmitted to primary energy generator 26, passing between discharge part 74 and grid 94 of the generator. With needles 86 of generator 26 acting as negative electrodes, liquid 72 within tank 20 acting as a positive electrode and with grid 94 acting as a bias, the seeds are subjected to electron, proton and positive and negative ion bombardment caused by the ambient air break down when contacted by the potential at discharge part 74. This directed potential and particle movement toward liquid 72 in tank 20 causes additional air to be drawn through opening 82 in the generator under dome 84 and through openings 80 in connector 78, past needles 86, like an air pump, where additional particles are produced. These particles of ions, electrons and protrons are directed towards liquid 72 within tank 20 with grid 94 serving to control the density and acceleration of the particles, especially the ions. Many of these particles enter the seed, including the root cell of its embryo. Additionally, the break down of the ambient air forms nitrogen particles which are transformed into fixed nitrogen and amino acids. Such nitrogen and amino acids are driven into the seed cells.

After passing through primary energy generator 26, the seeds are transported by conveyor belt 30 into secondary energy generator 28 which is similar in operation to the primary energy generator but which does not include a grid for the control of particle movement. As in energy generator 26, the operation of energy generator 28 causes ambient air to be drawn into the interior of the generator past needles 86 and into the flux field where the air is broken down into nitrogen particles with the formation of electrons, positive and negative ions and protons. These particles enter the underlying passing seeds in the same manner previously discussed for energy generator 26.

The internal structure of the seeds are enhanced in two ways by the energy imparted through generators 26, 28. The generators serve as an energy source for the seeds and as a material source depositing fixed nitrogen and amino acids within the root cell, chloroplast and metachondria of the seed. In this manner the imparted energy and material sources are used for genetic recombination in the DNA molecule with the embryonic potential of the seed being increased, thereby improving plant growth, vitality, yield, and germination.

The water and enzyme liquid coating about the seed acquired while passing through the blender station 24, serves to improve the electrical conductivity and receptiveness of the seed to the particle bombardment imparted in generator stations 26 and 28. The particles formed by generators 26 and 28 which do not contact or which are not absorbed by the seeds contact the liquid 72 in tank 20 which serves as a positive electrode. This creates more mobility of suspended colloidal particles and resistivity of pure water. The liquid viscosity is increased under these conditions and there is an increase in reactive water which improves the ability of the liquid to penetrate the seeds and to form amino acid and fixed nitrogen components as the liquid is recirculated from tank 20 to tank 66 and into blender station 24 by pump 56.

The seeds pass from secondary energy generator 28 to the discharge end of conveyor belt 30 where they fall by gravity through cathodic discharge station 24. Ambient air is forced by blower 98 across heating coils 100 which heats the air to approximately 130° F. The heated air contacts the falling seeds to reduce the hard seed content of the seeds. Additionally, as most seeds are stored before planting, the heated air further serves to reduce the moisture content of the seeds. The seeds are also subjected to the I.R. radiation from lamp 102 which improves the germination rate of the seeds as well as to increase the physiological activity of the chloroplast in the seed cell.

As the seeds fall through discharge station 34, the seeds contact each of the plates 104 in alternating zig-zag sliding motion to improve cell membrane stability and permanentability and to improve the viability and germination probabilities of the seed. The potentials of plates 104 are in decreasing order as contacted by the seeds. Finally, the seeds are discharged through coils 110 where they are subjected to R.F. energy. This increases the degree of water absorption, leaching solution conductivity and oxygen uptake. After passing through discharge station 34, the seeds are collected in a suitable receptacle for storage and eventual planting.

It is to be understood that the treatment above described is continuous with the seeds being introduced into hopper 42 of blender station 24, passing downwardly through the blender station, and thereafter through the primary and secondary energy generators 26 and 28 and out discharge station 34 in even flow.

Experimental field testing of seeds treated in accordance with the above described method of operation has revealed a substantial increase in yield. Corn seeds not treated produced a yield of 100.0 bushels per acre while corn seeds treated in accordance with the above described method produced a yield of 125.7 bushels per acre or an increased yield of 25.7% over the untreated seeds. Soy bean seeds untreated produced a yield of 37.0 bushels per acre. Soy bean seeds treated in accordance with the above described method produced a yield of 46.2 bushels per acre or an increased yield of 24.8% over the untreated seeds.

POWER AND CONTROL CIRCUITS FOR BLENDER STATION, PRIMARY AND SECONDARY ENERGY GENERATORS, AND CATHODIC DISCHARGE STATION.

Figure 7A:
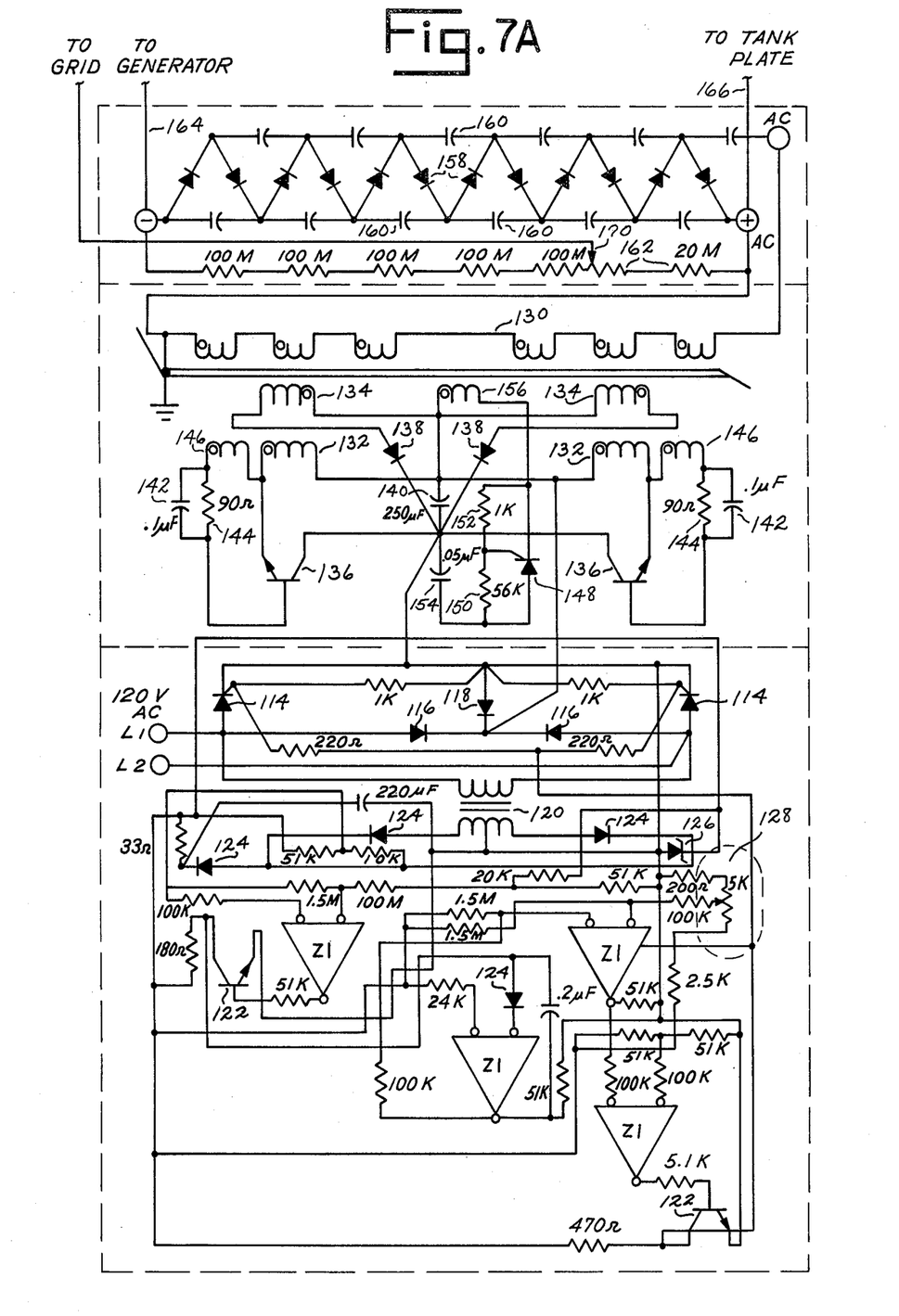
FIG. 7A is a circuit diagram represented within the indicated block in FIG. 7.

In FIG. 7A the preferred circuitry for providing electrical energy for the operation of primary energy generator 26 is shown. SCR'S 114, diodes 116 and power supressor diode 118 in conjunction with the noted resistors serve as a bridge circuit which rectifies the 120V, AC input to DC. Item 120 is a step-down transformer. A pulse width modulated control circuit is operationally connected to transformer 120 and the above described bridge circuit. Pulse width modulated control circuit includes transistors 122, an IC (LM 3900) identified as four individual operational amplifiers Z1, diodes 124, zener diode 126 and the resistors and capacitors shown. A detailed description of the pulse width modulated control circuit may be found in commonly owned U.S. application Ser. No. 898,514, filed Apr. 20, 1978.

Included within the figure of 7A is a push-pull inverter which is utilized to invert the DC from the bridge circuit to square wave AC at high frequency, in the range of approximately 10 to 20 KHz. The push-pull inverter includes secondary transformer windings 130, main transformer windings 132, return transformer windings 134, high voltage switching power transistors 136 working in a saturable mode, diodes 138 which are of the fast recovery type, such as having a trr of 100-150 nS, and a DC filtering capacitor 140. Capacitor 142, resistor 144 and transformer winding 146 constitute a feed-back circuit for each transistor 136.

Each paired main winding 132 and return winding 134 are wound together or bifilar with the return windings being in reverse polarity to the main windings as illustrated. During operation of the push-pull inverter with alternating transistor 136 cut-off, the back emf in windings 132 will be transferred to mutually coupled windings 134 and returned to the power source through connecting diodes 138. Such emf utilization improves the circuit efficiency for transistors 136 and the transformer.

The starter circuit for the push-pull inverter includes SCR 148, resistors 150 and 152, capacitor 154 and transformer winding 156. Winding 156 is mutually coupled to the main windings 132 and has but a few turns, two in the illustrated embodiment. Upon power turn-on, filtering capacitor 140 and capacitor 154 are charged at different rates. SCR 148, properly biased by resistors 150 and 152, then triggers capacitor 154 which causes winding 156 to receive a charge. Each mutually coupled main winding 132 is then also charged with the one mutually polarized transistor 136 receiving its starting voltage. This starts the push-pull inverter operation. The starter circuit after having delivered its single shot now remains dormant for the remainder of the inverter operation.

The output from secondary transformer windings 130 passes into a voltage multiplier identified by interconnected diodes 158, capacitors 160 and resistors 162. The multiplier rectifies and increases the secondary transformer winding voltage 12 times or up to its maximum operating peak voltage of approximately 150,000 volts of ripple DC. Line 164 connects the multiplier with wire 92 of primary energy generator 26. Line 166 is connected to a metal plate 168, preferably formed of stainless steel, submerged within the liquid 72 in tank 20. Plate 168 serves to provide a positive charge for energy generators 26, 28 and for blender station 24. A variable resistance or control 170 associated with resistors 162 is connected to grid 94 of primary energy generator 26. Control 170 regulates the density of the particle bombardment and energy production of the primary energy generator with grid 94 serving as a bias.

Variable resistor 128 in the pulse width modulated control circuit serves to control or modulate the duty cycle of the circuit of FIG. 7A and to vary the negative peak voltage of primary energy generator 26 between 75,000 and 150,000 volts. Thus the negative potential output of the primary energy generator 26 can be varied in intensity to accommodate different types of seeds.

Figure 7B:
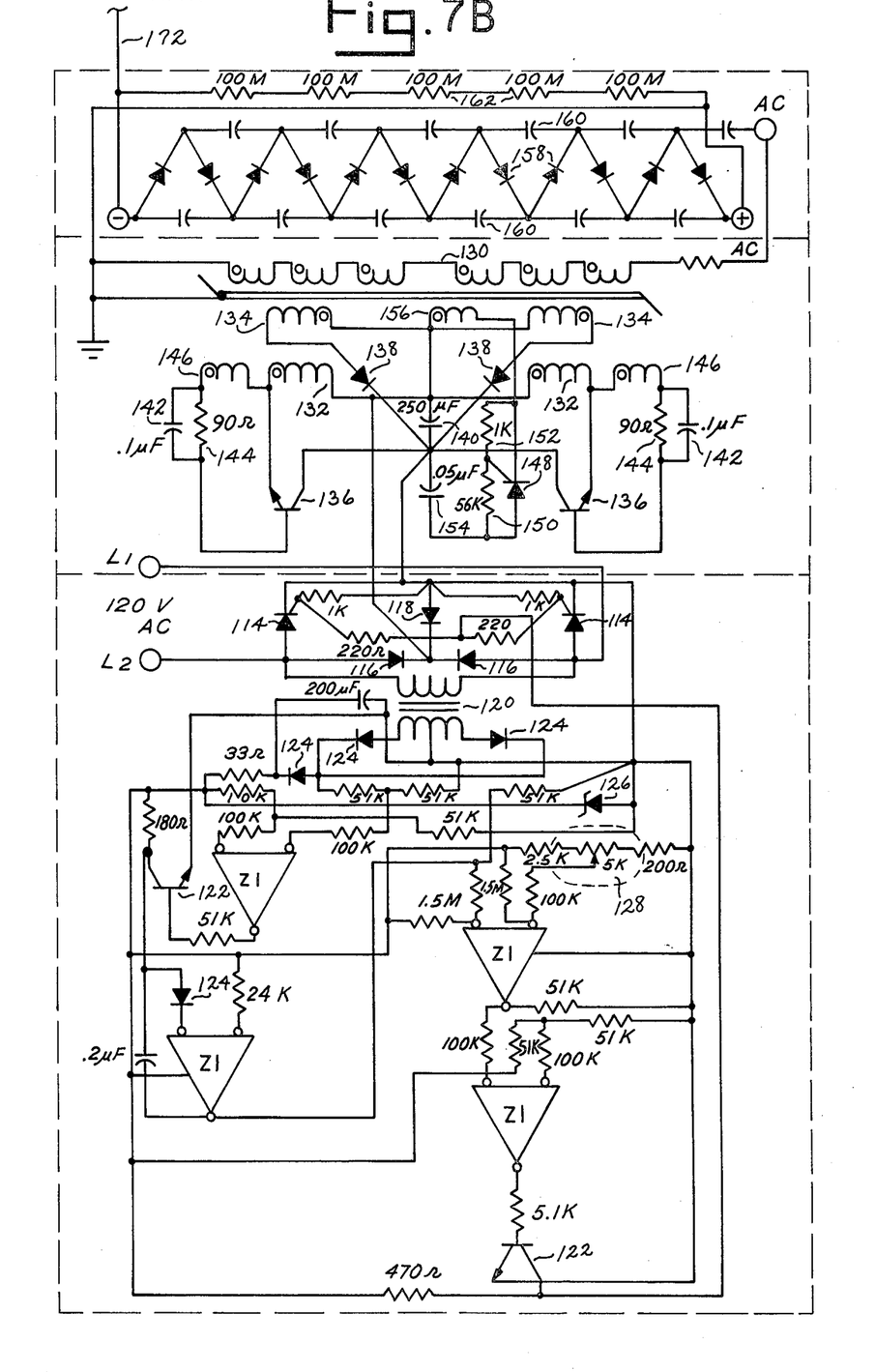
FIG. 7B is a circuit diagram represented within the indicated block in FIG. 7.

The control and power supply circuit of FIG. 7B has its output, designated by line 172, connected to wire 92 in secondary energy generator 28. The operation of this circuit with its inter-related bridge circuit, pulse width modulated control circuit, push-pull inverter circuit, starter circuit, and voltage multiplier is like that previously described for FIG. 7A with the components thereof being correspondingly lettered and numbered. The circuit of FIG. 7B differs in one respect in that no control or variable resistor 170 is utilized. In all other respects the operation of the circuit of 7B is like that of FIG. 7A. Variable resistor 128 through pulse width modulation varies the intensity of secondary energy generator 28 between 75,000 and 150,000 peak negative volts.

Figure 7C:
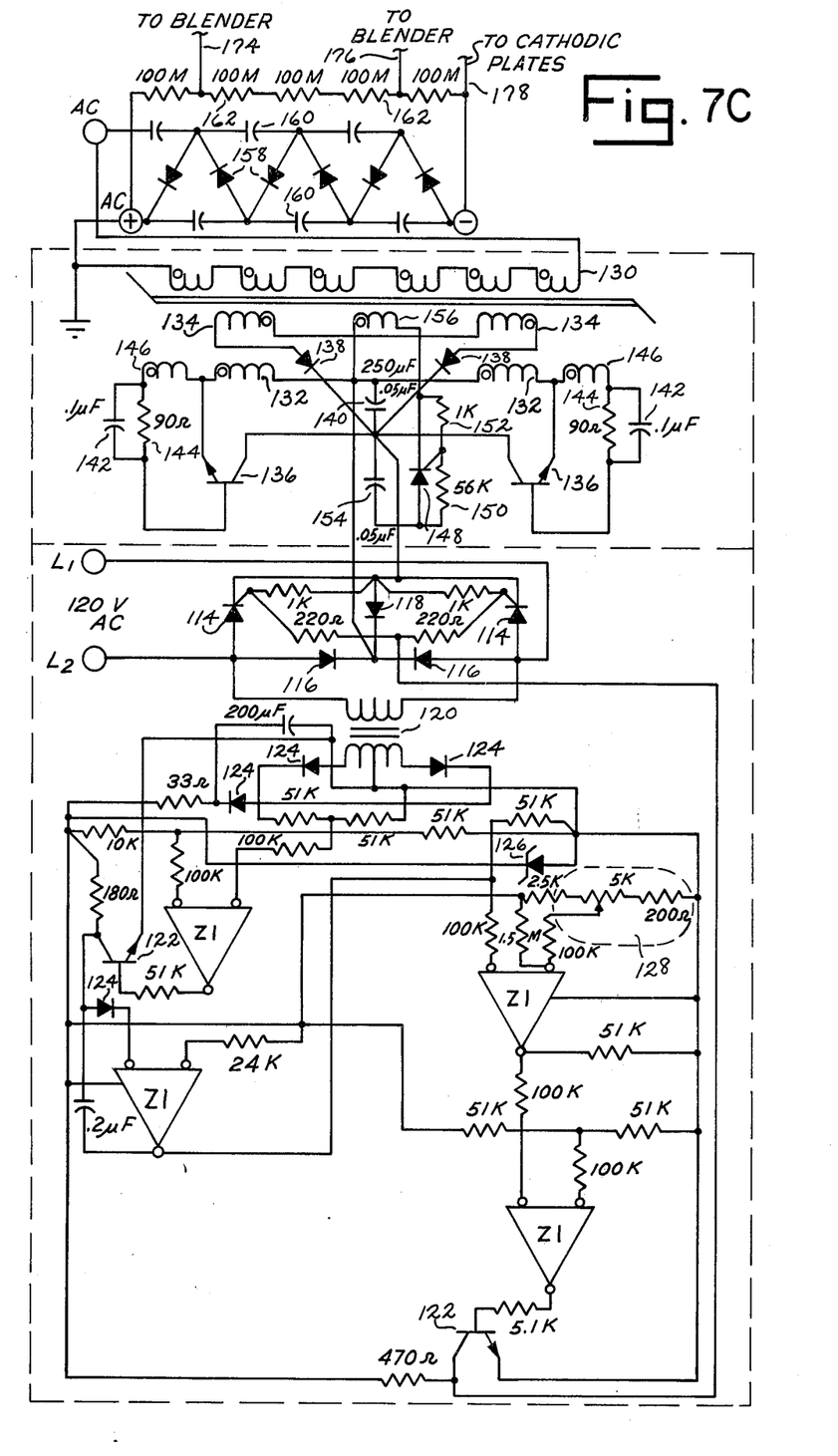
FIG. 7C is a circuit diagram represented within the indicated block in FIG. 7.

The control and power circuit shown in FIG. 7C is like that of the circuit of FIG. 7B with the components thereof being correspondingly lettered and numbered and their functions being previously described for the circuit of FIG. 7A. Line 174 of this circuit is connected to one probe 48 of blender station 24, while line 176 from this circuit is connected to the remaining probe 48 of the blender station. Line 174 serves to provide its connected probe 48 with a 10,000 KV negative potential and line 176 serves to provide its connected probe 48 with a 60 KV negative potential. Line 178 connects the voltage multiplier of circuit 7C with plates 104 in cathodic discharge station 34. The difference between the circuit of FIG. 7C and that of 7B is in the size of the voltage multiplier. The blender station and cathodic plates of the cathodic discharge stations need less voltage than that of secondary energy generator 28. This circuit also includes a variable resistor 128 which serves as a control for varying the power output to accommodate different types of seeds.

Figures 7D, 7E:
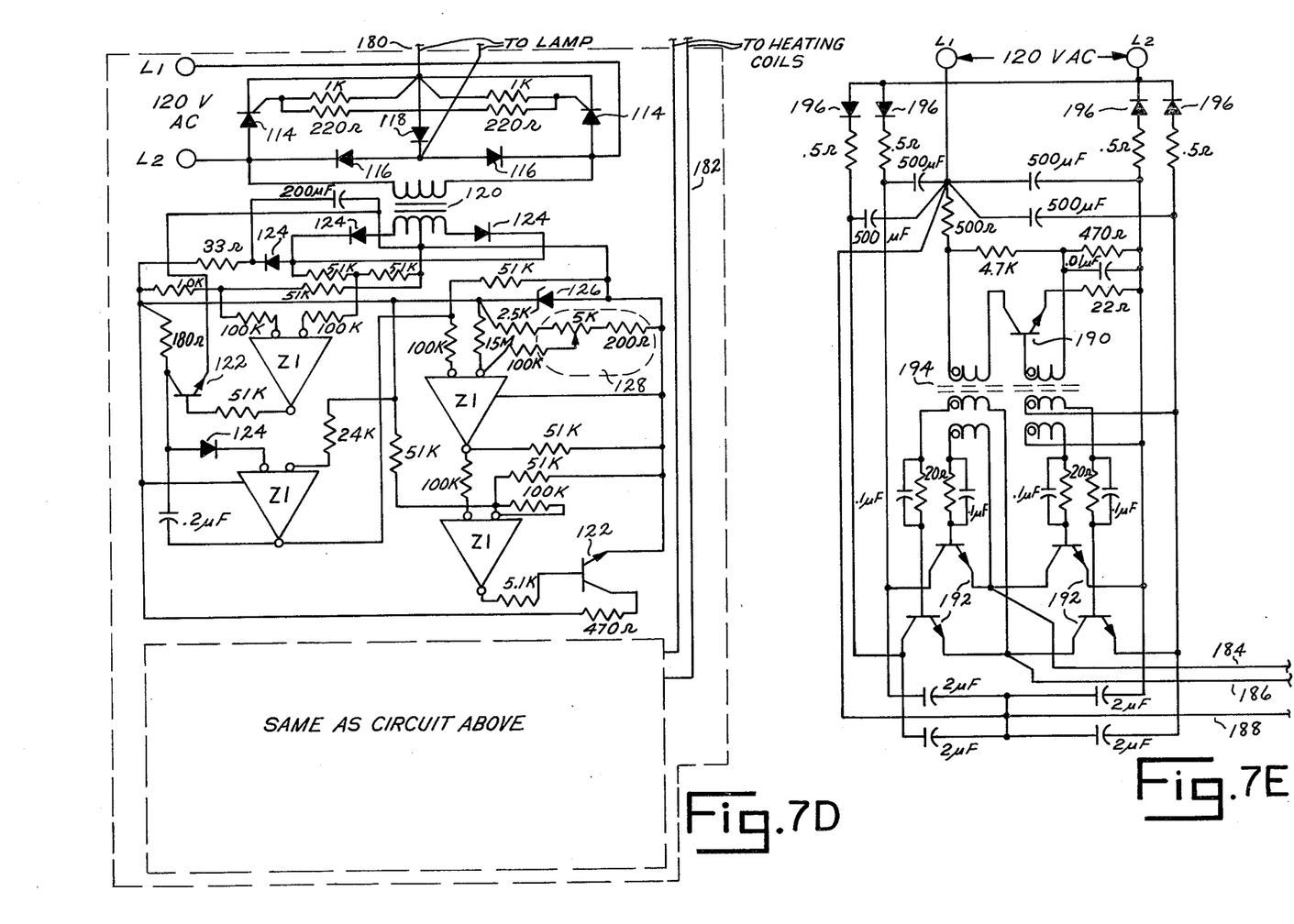
FIG. 7D is a circuit diagram represented within the indicated block in FIG. 7.
FIG. 7E is a circuit diagram represented within the indicated block in FIG. 7.

The power and control circuit of FIG. 7D includes only the pulse width modulated control and bridge circuits shown and described in the circuit of FIG. 7A. The manner of operation of the circuit of 7D is like that described for the pulse width modulated control and bridge circuits of FIG. 7A with the components thereof being correspondingly numbered and lettered. Lines 180 in this circuit are connected to lamp 102 of the cathodic discharge station 34. A like circuit, consisting of the pulse width modulated control and bridge circuits of FIG. 7A is connected by lines 182 to the heating coils 100 within the cathodic discharge station. The power to lamp 102 is variable through the utilization of variable resistor or control 128 to vary the IR spectrum emitted from the lamp. A similar power control is utilized to vary the heat output from heating coils 100.

The power circuit of FIG. 7E is utilized with coils 110 in the cathodic discharge station 34. Line 184 of this circuit is connected to terminal "a", line 186 is connected to terminal "b" and line 188 is connected to terminal "c" of the interconnected coils shown schematically in FIG. 7. The circuit of FIG. 7E includes an oscillator transistor 190, power transistors 192, driving transformer 194, diodes 196 and associated resistors and capacitors. The circuit representa a dual push-pull power oscillator for a high power, high frequency output.

It is understood that the invention is not to be limited to the details above given but may be modified within the scope of the appended claims.

What I claim is:

1. A generator for producing particle elements from air comprising a housing having oppositely open ends to admit said air, an electrode located within said housing between said open ends, a collector of charges located at one open end, means for providing said electrode with a high voltage potential directed toward said collector, said electrode including a generally spherical dielectric part and a plurality of spaced electrically conductive needles each anchored at one end in said dielectric part, said needles extending generally radially from said dielectric part over a sector thereof in the direction of said collector, each needle connected to said potential providing means by a current limiter means for suppressing ozone production about said needles in the presence of said air.

2. The generator of claim 1 wherein each current limiter means is a resistor connected in series with said potential producing means at said one needle end.

3. The generator of claim 1 and a biasing grid located between said electrode and collector.

4. The generator of claim 1 wherein said housing defines throat means for providing a venturi effect by which said air is drawn through said housing from the other end to said one end thereof upon electrode potential production, said spherical dielectric part of the electrode being located spacedly downstream relative to the direction of said air through said housing from said throat means.

* * * * *